Aug. 11, 1964     J. W. THOMAS     3,143,824
FISH LURE
Filed Sept. 27, 1963
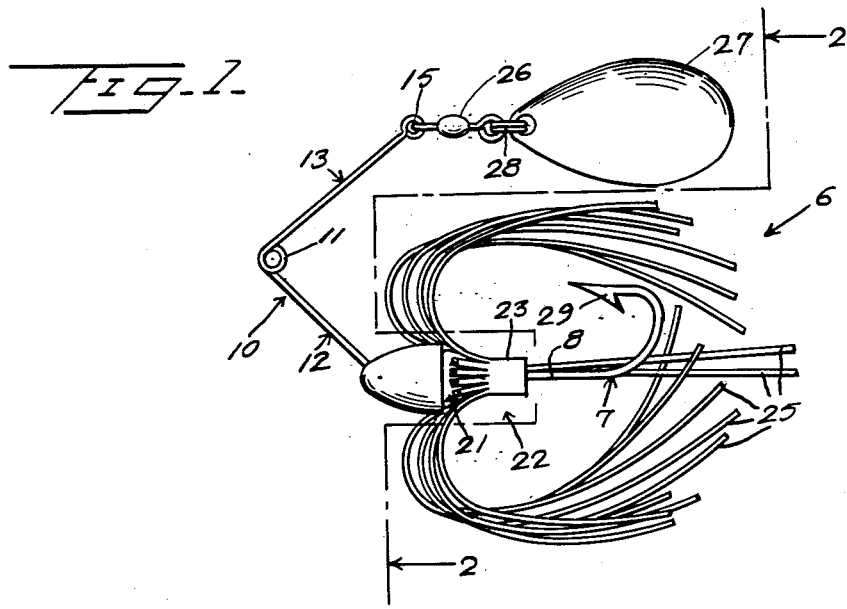
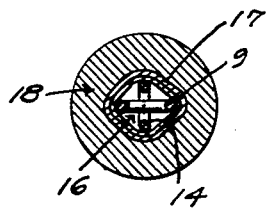
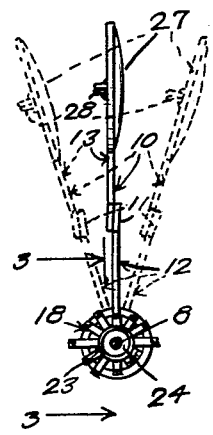
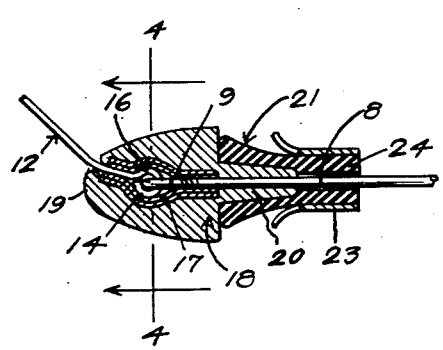
INVENTOR
JOHN W. THOMAS
BY John N. Randolph
ATTORNEY

United States Patent Office 3,143,824
Patented Aug. 11, 1964

3,143,824
FISH LURE
John W. Thomas, 402 Marrietta St., Haynesville, La.
Filed Sept. 27, 1963, Ser. No. 312,071
5 Claims. (Cl. 43—42.11)

This invention relates to a novel fish lure or artificial bait and more particularly to a fish lure having a unique loose head action whereby an element, by which the lure is adapted to be attached to a fishing line or leader and which supports a spinner, is capable of oscillating relative to the weighted head or body of the lure to greatly enhance the action or movement of the spinner.

It is a known fact that fish are attracted by vibrations and other movements. Accordingly, it is a primary object of the present invention to provide a fish lure which is so constructed that a spinner, constituting a part of the lure, will be caused to rotate, oscillate and swing in a very unique manner to cause a very pronounced vibration of the spinner and lure to thereby render the lure very attractive to game fish.

Still another object of the invention is to provide a unique means for creating the loose head action whereby the spinner supporting part of the lure is capable of oscillating relative to the head to obtain the desired result.

Various other objects and advantages of the invention will hereinafter become more fully apparent from the following description of the drawing, illustrating a presently preferred embodiment thereof, and wherein:

FIGURE 1 is a side elevational view of the fish lure as it will appear in use;

FIGURE 2 is a transverse sectional view thereof, partly in end elevation, taken usbstantially along the line 2—2 of FIGURE 1;

FIGURE 3 is an enlarged fragmentary longitudinal sectional view, taken substantially along the line 3—3 of FIGURE 2, and FIGURE 4 is a cross sectional view through the head or lure body, taken substantially along a plane as indicated by the line 4—4 of FIGURE 3.

Referring more specifically to the drawing, the fish lure in its entirety is designated generally 6 and includes a conventional fishhook 7 having a shank 8 which terminates in an eye 9, as best seen in FIGURE 4.

A bridle or support, designated generally 10, is formed from a single strand of relatively resilient wire which is wound intermediate of its ends to provide a spring coil 11 from which the end portions of the strand extend in diverging relation to one another to form arms 12 and 13 which are capable of yielding relative to one another and which terminate at their distal ends in eyes 14 and 15, respectively. The eye 14 is interconnected with the eye 9 of the fishhook in a conventional manner to form a joint, designated generally 16.

The eyes 9 and 14 forming the joint 16, the portion of the shank 8 located adjacent thereto and the portion of the arm 12 disposed adjacent said joint, are encased in a sleeve-like encasement 17 which may comprise a foil wrapping or which may be composed of any other readily yieldable material which is substantially impervious. A lead head or body 18 is molded around the wrapping 17. The wrapping 17 extends to adjacent an upper portion of the tapered rounded forward end or nose 19 of the head 18, from which the arm 12 projects, as seen in FIGURE 3. The arm 12 is bent slightly adjacent the surface of the nose 19 at the point through which said arm projects, so that the portion of the arm 12 disposed within the head 18 forms an obtuse angle of slightly less than 180° with the part of said arm 12 which is disposed externally of the head 18.

The head 18 preferably includes a restricted axially disposed rear or trailing end portion 20 which extends beyond a rear adjacent end of the wrapping or enclosure 17 and through which a part of the hook shank 8 extends and in which said hook shank portion is embedded and immovably anchored. A sleeve 21 of rubber or other suitable material has a forward end disposed over and engaging the part 20 and secured thereto in any suitable manner, as by being stretched tightly thereover.

A conventional type hackle, designated generally 22, includes a ribbon or sleeve 23 which is secured around the rear portion 24 of the sleeve 21, which portion 24 is disposed around a part of the hook shank 8 and behind the part 20. A plurality of long slender strands 25, forming the hackle elements, extend from the forward edge of the ribbon or sleeve 23.

One end of a conventional swivel 26 is connected to the eye 15 of the other arm 13 of the bridle 10, and a conventional spinner 27 is attached to the other trailing end of the swivel 26 by a conventional split ring 28.

A conventional fishing line or leader, not shown, is adapted to be attached to the spring coil 11 in a conventional manner so that said spring coil forms a line or leader engaging eye disposed substantially intermediate of the ends of the bridle 10. Accordingly, when the lure 6 is being retrieved or trolled it will be pulled through the water in a direction from right to left of FIGURE 1 to cause the hackle strands 25 to turn back from their supporting member 23 around the bill 29 of the fishhook 7, and said hackle 22 may obviously be made of various colors, and the head or body 18 may likewise be suitably colored or provided with other suitable surface markings.

Since the lead forming the head or body 18 does not adhere to the eye 14 or the part of the arm 12 disposed adjacent thereto due to said parts being enclosed by the encasement 17, said arm 12 and its eye 14 may oscillate relative to the hook eye 9, the head 18 and encasement 17, about an axis nearly coinciding with the axis of the head 18 and hook shank 8. Thus, the bridle 10 is capable of oscillating relative to the head 18 and fishhook 7 as illustrated in full and dotted lines in FIGURE 2, or the head 18 and hook 7 may oscillate relative to the bridle 10 to produce a loose connection between the head 18 and bridle 10 or a loose head action wherein the extent of movement is definitely restricted and regulated.

As the lure is being trolled or retrieved the bridle 10 will swing relative to the head 18 between its extreme dotted line positions of FIGURE 2. The resulting oscillating movement of the spinner 27 with the bridle 10 will greatly increase the action of the spinner as it swings back and forth above the hook 7, so that the spinner in addition to revolving will oscillate with the bridle and also relative thereto. This increased action of the spinner creates a vibration which is very effective in attracting game fish to the lure 6. It will be understood that the weighted head 18 will maintain the lure parts substantially in the positions thereof as seen in FIGURE 1 and with the spinner 27 above the hook 7.

Various modifications and changes are contemplated and may be resorted to, without departing from the function or scope of the invention as hereinafter defined by the appended claims.

I claim as my invention:

1. A fish lure comprising a bridle having a forward apex portion defining a line or leader engaging eye, a first arm extending downwardly and rearwardly from said eye, a second arm extending upwardly and rearwardly from the eye, a fishhook having a shank terminating in an eye, said first arm terminating in an eye connected to the eye of the fishhook shank and forming a loose joint therewith, a molded head enclosing said joint and fixed to a part of the fishhook, means encasing said joint and embedded in said head for maintaining a loose connection between the head and bridle to permit oscillating movement only of the bridle relative to the head, a spinner, and means swivelly connecting said spinner to said second arm of the bridle.

2. A fish lure as in claim 1, said first mentioned means comprising a sleeve-like encasement formed of a material impervious to the material of said head.

3. A fish lure as in claim 1, said first mentioned means comprising a sleeve-like encasement of metal foil.

4. A fish lure as in claim 1, said bridle being formed of a single strand of spring wire including a coiled intermediate portion defining said line or leader engaging eye and end portions of approximately the same length forming said arms.

5. A fish lure comprising a bridle including an intermediate portion defining a line or leader engaging eye, a lower arm extending downwardly and rearwardly from said eye, an upper arm extending upwardly and rearwardly from the eye, a fishhook having a shank terminating in an eye, said lower arm terminating in an eye connected to the eye of the hook shank and forming therewith a loose joint, a molded head fixed to said hook shank and enclosing said loose joint, means embedded in said head and encasing said loose joint and a part of said lower arm to permit a limited oscillating movement only of the bridle and head relative to one another, a spinner, and means swivelly connecting said spinner to said upper arm.

References Cited in the file of this patent

UNITED STATES PATENTS

| | | |
|---|---|---|
| 1,832,768 | Davenport | Nov. 17, 1931 |
| 2,765,572 | Woolfe | Oct. 9, 1956 |
| 3,012,356 | Tyson | Dec. 12, 1961 |